United States Patent
Chen et al.

(10) Patent No.: US 7,810,992 B2
(45) Date of Patent: Oct. 12, 2010

(54) NON-CONTACT TEMPERATURE-MEASURING DEVICE AND THE METHOD THEREOF

(75) Inventors: Kun Sung Chen, San-Chung (TW); Ying Chao Lin, San-Chung (TW); Hsing Ou Yang, San-Chung (TW)

(73) Assignee: Avita Corporation, Taipei County (TW)

( * ) Notice: Subject to any disclaimer, the term of this patent is extended or adjusted under 35 U.S.C. 154(b) by 391 days.

(21) Appl. No.: 11/957,658

(22) Filed: Dec. 17, 2007

(65) Prior Publication Data
US 2008/0246625 A1    Oct. 9, 2008

(30) Foreign Application Priority Data
Apr. 9, 2007    (TW) .............................. 96112250 A

(51) Int. Cl.
G01C 3/08 (2006.01)
G01J 5/00 (2006.01)
G01V 8/00 (2006.01)

(52) U.S. Cl. .................. 374/121; 374/129; 250/559.38; 356/5.01

(58) Field of Classification Search ................. 374/120, 374/121, 124, 130, 161, 208, 6, 133, E1.001, 374/E13.003, E3.001; 250/559.38; 356/5.01
See application file for complete search history.

(56) References Cited

U.S. PATENT DOCUMENTS

| | | | |
|---|---|---|---|
| 4,944,186 A | 7/1990 | Dorr | |
| 5,823,679 A | 10/1998 | Hollander et al. | |
| 6,196,714 B1 * | 3/2001 | Bellifemine et al. | 374/121 |
| 6,373,579 B1 * | 4/2002 | Ober et al. | 356/627 |
| 6,527,439 B1 * | 3/2003 | Bellifemine | 374/121 |
| 6,631,287 B2 | 10/2003 | Newman et al. | |
| 6,742,927 B2 * | 6/2004 | Bellifemine | 374/121 |
| 7,052,175 B2 | 5/2006 | Hollander | |
| 7,154,112 B2 * | 12/2006 | Eubelen | 250/559.31 |
| 7,491,956 B2 * | 2/2009 | Knoche et al. | 250/559.29 |
| 2003/0099277 A1 * | 5/2003 | Bellifemine | 374/121 |
| 2005/0011762 A1 | 1/2005 | Provonchee | |
| 2005/0151053 A1 * | 7/2005 | Griffin et al. | 250/206 |
| 2006/0044545 A1 * | 3/2006 | Horn | 356/4.01 |
| 2006/0050766 A1 * | 3/2006 | Hollander et al. | 374/121 |
| 2007/0191729 A1 * | 8/2007 | Park et al. | 600/551 |

(Continued)

*Primary Examiner*—Lisa M Caputo
*Assistant Examiner*—Jonathan Dunlap
(74) *Attorney, Agent, or Firm*—Tim Tingkang Xia; Morris, Manning & Martin LLP

(57) ABSTRACT

This invention provides a non-contact temperature-measuring device including a distance sensor unit, an alarm unit, a temperature sensor unit, a microprocessor unit and a display unit. The distance sensor unit measures the distance between the device and a target. The alarm unit gives an alarm when the distance sensor unit measures a predetermined distance value. The temperature sensor unit measures a temperature of the target after the alarm unit gives the alarm. The microprocessor unit stores data of the predetermined distance value and the temperature value measured by the temperature sensor unit; the microprocessor unit also processes a distance signal emitted by the distance sensor unit and a temperature signal emitted by the temperature sensor unit. When the target's distance value equals the predetermined distance value, the microprocessor unit will further send a command for the alarm unit to give an alarm. The display unit of the device displays the temperature value that is measured by the temperature sensor unit and processed by the microprocessor unit subsequently.

19 Claims, 5 Drawing Sheets

U.S. PATENT DOCUMENTS

2008/0181590 A1* 7/2008 Radwill et al. .............. 392/385
2009/0193875 A1* 8/2009 Komninos ..................... 73/40
2009/0257469 A1* 10/2009 Jones et al. ................. 374/133

* cited by examiner

NON-CONTACT TEMPERATURE-MEASURING DEVICE AND THE METHOD THEREOF

BACKGROUND OF THE INVENTION

1. Field of the Invention

The present invention relates to a method and device for temperature measurement, and more particularly to a method and device for non-contact temperature measurement.

2. Description of the Prior Art

Given that conventional contact thermometers (for example, mercury or electronic thermometers) are falling short of consumers' needs, it is necessary to further develop methods and devices for temperature measurement that enable measurements to be more quickly, more accurate, easier to be carried out, easier to read its result, more harmless, and more user-friendly. Currently, non-contact temperature measurement devices using infrared radiation, e.g., infrared ear thermometers or forehead thermometers, have the advantages mentioned above and have thus constitute a major part of temperature measurement devices on the market. The most significant advantage of an infrared thermometer lies in measuring a target's temperature by non-contact means, and it is especially useful when the target is extremely hot, dangerous to touch, or not accessible.

When a user presses a switch button on a conventional infrared thermometer, a probe of the thermometer will point to the target and measurement of the target's temperature can be taken in a non-contact way. During the process, the measurement is taken with indistinct distances between the probe of the infrared thermometer and the target. The various distances of the target then generate different outcomes of temperature value in each measurement, and thus, errors and uncertainties of the measurement increase.

SUMMARY OF THE INVENTION

One objective of the present invention is to provide a device for non-contact temperature measurement capable of setting a predetermined distance value before measuring a target's distance so as to reduce errors and to measure the target's temperature value more accurately.

To achieve the above-mentioned objective, the present invention provides a non-contact temperature-measuring device comprising a distance sensor unit, an alarm unit, a temperature sensor unit, a microprocessor unit and a display unit. The distance sensor unit measures a target's distance value. The alarm unit gives an alarm after the distance sensor unit measures a predetermined distance value of the target. The temperature sensor unit measures a target's temperature after the alarm unit gives the alarm. The microprocessor unit stores the predetermined distance value and the temperature value measured by the temperature sensor unit; the microprocessor unit further processes a distance signal sent by the distance sensor unit and a temperature signal sent by the temperature sensor unit. When the measured distance value of the target equals the predetermined distance value, the microprocessor unit sends a command for the alarm unit to give an alarm. The display unit displays the temperature value measured by the temperature sensor unit and subsequently processed by the microprocessor unit.

It is preferable that the present invention further comprises a push-button unit for an operator to input a command that makes the temperature sensor unit to start measuring the target's temperature after the distance sensor unit measures the predetermined distance value.

It is preferable that the push-button unit is a button switch.

It is preferable that the distance sensor unit is a radiation emitter and receiver device.

It is preferable that the radiation emitter and receiver device is an infrared emitter and receiver device.

It is preferable that the infrared emitter and receiver device includes an infrared emitter and an infrared receiver.

It is preferable that the infrared emitter is for emitting radiation, and the infrared receiver is for receiving the radiation reflected from the target that has been hit by the radiation emitted by the infrared emitter. The received radiant energy is then converted into electrical energy in the form of digital signals; by identifying the voltage output of the electrical energy, the distance between the target and the infrared emitter and receiver device can be measured.

It is preferable that an isolation board is further disposed between the infrared emitter and the infrared receiver so that the infrared receiver is ensured to receive the reflected radiation.

It is preferable that the distance sensor unit and the temperature sensor unit are infrared sensors or ultrasonic sensors for measuring a distance value and a temperature value.

It is preferable that the alarm unit is a speaker or an indicator light, or a combination of both. The speaker gives an alarm of long beep, and the indicator light is an LED light.

The present invention provides a method for non-contact temperature measurement including the following steps: setting a predetermined distance value, measuring a target's distance value, determining whether the target's distance value equals the predetermined distance value, giving an alarm, measuring the target's temperature value and storing the measurement data into memory, and displaying the stored measurement data.

It is preferable that the target's distance value is measured by a means associated with radiant energy.

It is preferable that said means associated with radiant energy is employed by, first, receiving the reflected radiation of an infrared wave that has hit the target, and by subsequently, converting the radiant energy to electrical energy in the form of digital signals. Said means is described in detail as follows. First, a first distance $L_1$ closest to the infrared emitter and receiver device and a second distance $L_2$ farthest from the infrared emitter and receiver device are measured. Second, the individual radiant energy values of infrared radiation reflected at a distance of $L_1$ and at a distance of $L_2$ are converted respectively to values $AD_1$ and $AD_2$ of the electrical energy in the form of digital signals. Third, a slope formula $$S = \frac{AD_2 - AD_1}{L_2 - L_1}$$

is applied to obtain the slope between two points, and accordingly, the different values of the electrical energy at different distances are obtained. The target's distance value, which is the result being sought for, can be further calculated by reversing the formula.

It is preferable that the radiation is of an infrared radiation.

It is preferable that after the step of giving an alarm, the method further includes a step of a button switch being pressed by the operator so that measurement of the target's temperature is activated accordingly.

The present invention provides a non-contact temperature-measuring device and the method thereof that measure a target's distance by referring to a predetermined distance. The present invention enables operators to measure temperature more quickly and gain a more accurate result. The objective of reducing errors and uncertainties is then achieved.

Further scope of the applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
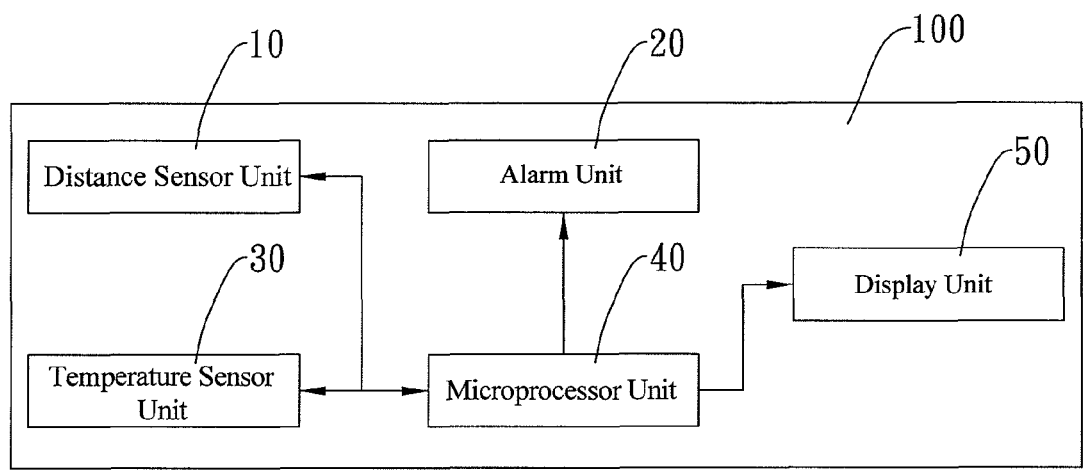
FIG. 1 is a block diagram of a non-contact temperature-measuring device of the present invention.

Referring to FIG. 1, the device for non-contact temperature measurement 100 of the present invention includes a distance sensor unit 10 for measuring a target's distance value; an alarm unit 20 for giving an alarm when the distance sensor unit 10 measures a predetermined distance value d; a temperature sensor unit 30 for measuring the target's temperature when the alarm unit 20 gives the alarm; a microprocessor unit 40 for storing the predetermined distance value d and the temperature value measured by the temperature sensor unit 30, for processing the distance signals emitted by the distance sensor unit 10 and the temperature signals emitted by the temperature sensor unit 30, and for sending a command for the alarm unit 20 to give an alarm; and a display unit 50 for displaying the temperature value measured by the temperature sensor unit 30 and subsequently processed by the microprocessor unit 40.

The present invention further includes a push-button unit (not shown) for inputting a command. When the distance sensor unit 10 measures a predetermined distance of the target, an operator can input a command for the temperature sensor unit 30 to start measuring the target's temperature value. Furthermore, the push-button unit of the present invention is a button switch 60 (as shown in FIG. 2).

In this embodiment, the distance sensor unit 10 and/or the temperature sensor unit 30 is/are infrared sensors and/or ultrasonic sensors for measuring a distance value and a temperature value. The alarm unit 20 is a speaker or an indicator light or a combination of both. If the alarm unit 20 is a speaker, the alarm message will be a long beep. If the alarm unit 20 is an indicator light, it will be an LED light.

Additionally, the present invention further includes an error identification mechanism. If the distance sensor unit 10 does not measure a predetermined distance value while the operator presses the button switch by mistake, the device for non-contact temperature measurement 100 will not start measuring the target's temperature. Given that this error identification mechanism of circuit design can be achieved easily by those skilled in the prior art, this mechanism shall not be specified herein.

Figure 2:
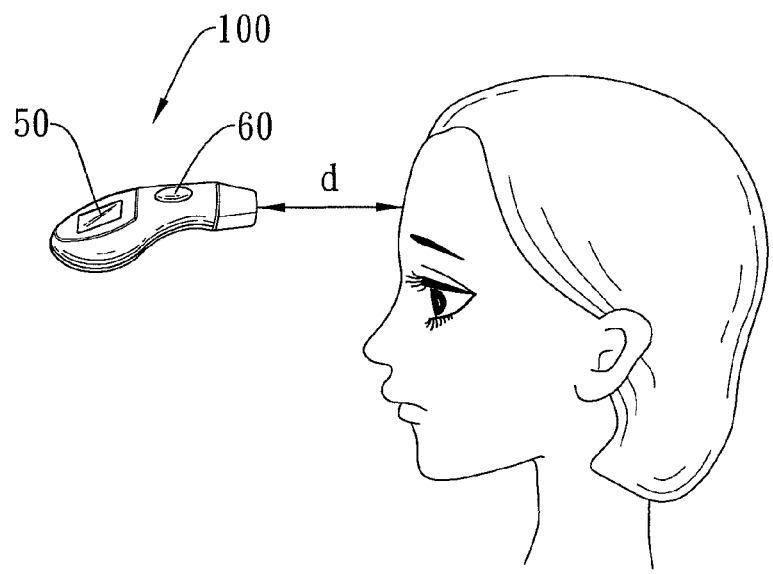
FIG. 2 is a schematic view showing the use of the device of the present invention.

Referring to FIG. 2, a schematic view of using the device of the present invention is shown. With the device for non-contact temperature measurement 100, an operator points to a target whereof temperature is to be measured. In this embodiment, the target is a human forehead. The device 100 is then moved forwards and backwards so that the distance sensor unit 10 of the device can constantly measure the varying distances from the target; the operation does not stop until the distance sensor unit 10 measures a predetermined distance value d. When the predetermined distance value d set for the device 100 is measured, the microprocessor unit 40 will send a command for the alarm unit 20 to give an alarm. The operator now presses the button switch 60, and the temperature sensor unit 30 starts measuring the target's temperature. The measured temperature value is stored in the microprocessor unit 40 and then displayed on the display unit 50.

Figure 3:
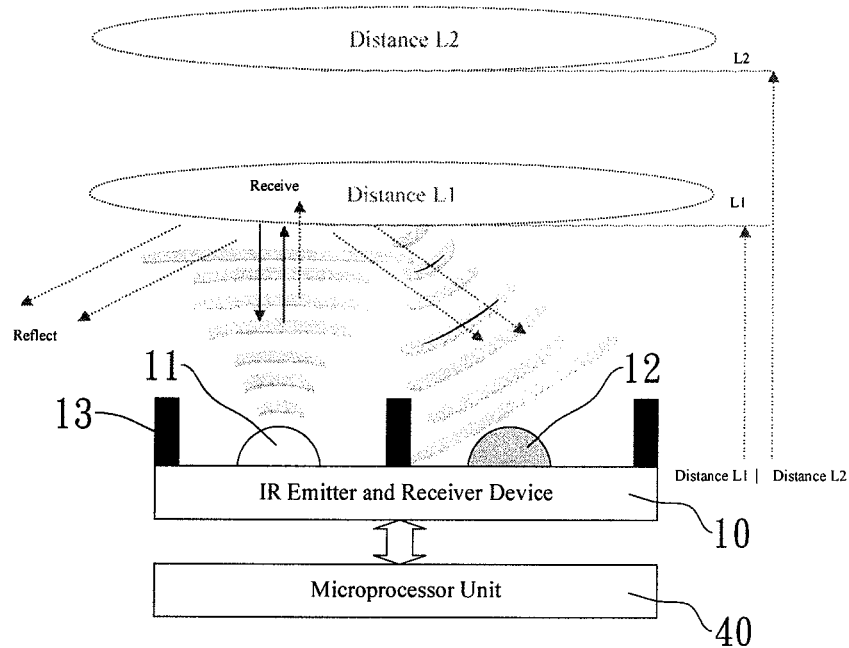
FIG. 3 is a schematic view showing measuring the target's distance value with the device of the present invention.

Referring to FIG. 3, the schematic illustration shows how the device for non-contact temperature measurement of the present invention measures a target's distance. The distance sensor unit 10 of the present invention is a radiation emitter and receiver device, and in this embodiment, it is an infrared emitter and receiver device. The infrared emitter and receiver device 10, which measures the target's distance by a means associated with radiant energy, includes an infrared emitter 11 and an infrared receiver 12. Generally, a radiation wave has many characteristics, one of which being that it reflects from an object right after hitting the object. Moreover, a radiation wave has different conductivities in different media, which results in different speeds of a wave and furthermore, in different properties of a wave. Therefore, it is known that when the speed and conductivity of a radiation wave is fixed, a distance can be inferred from the properties, e.g., energy, of a reflected wave. Since infrared wave is a kind of radiation wave in certain waveband, it is used to obtain the abovementioned objective in this embodiment. The infrared emitter 11 emits a radiation containing energy, and the radiation reflects after hitting the target. The infrared receiver 12 then receives the reflected radiation containing energy as well. The energy of the reflected radiation is further converted to electrical energy. Accordingly, the distance between the infrared emitter and receiver device and the target can be identified by the voltage output.

Figure 4:
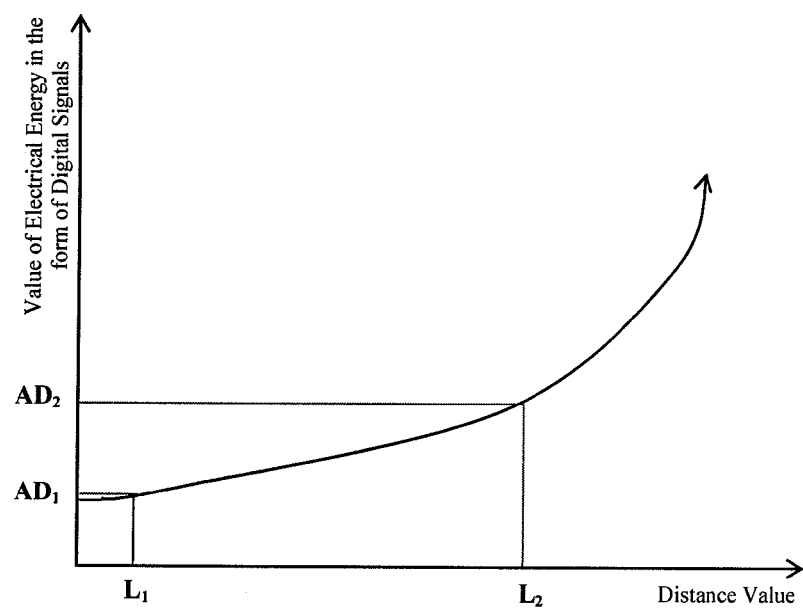
FIG. 4 is a curve diagram showing the distance value between the infrared receiver and the target, and the value of reflected energy.

Referring to FIG. 4, linear relationship can be observed between the distance values and the reflected energy values in a specific range of distance, as distance $L_1$ to distance $L_2$. The optimal distance of a temperature sensor unit lies in this range. Thus, this invention applies the linear relationship to measure distance. Further detail of said means is described as follows with reference to FIG. 3. The infrared emitter 11 emits a radiation that hits the target from a distance $L_1$ closest to the target; the infrared receiver 12 then receives the reflected radiation and identifies its energy. The analog signal of energy is transferred to digital signal $AD_1$. The distance $L_2$ farthest from the target can be calculated with the same method: the infrared emitter 11 emits a radiation to hit the target at a distance $L_2$; the infrared receiver 12 then receives another reflected radiation. The analog signal of energy is transferred to digital signal $AD_2$. Then, a slope between a point at the distance $L_1$ and a point at the distance $L_2$ can be calculated by applying the above-mentioned values to this slope formula:

$$S = \frac{AD_2 - AD_1}{L_2 - L_1}.$$

The calculation result is then defined in the microprocessor unit 40 to render a value $AD_n$ at every distance $L_n$.

To measure the target's temperature, the operator points the device of the present invention to the target, and distance detection starts first, the process being: the infrared emitter 11 emits a radiation that hits the target; the infrared receiver 12 receives the radiation reflected from the target; the reflected radiant energy is converted into electrical energy value $AD_n$ in the form of digital signals and then sent to the microprocessor unit 40; the value $AD_n$ is applied to the slope formula, and the distance value $L_n$ between the infrared receiver 12 and the target is calculated by reversing the formula: $AD_n=((L_n-L_1)\times S)+AD_1$; the device 100 does not stop measuring distance until the predetermined distance value d is obtained; the microprocessor unit 40 then sends a command for the alarm unit 20 to give an alarm; the operator presses the button switch 60 to activate temperature measurement by the temperature sensor unit 30; the measured temperature value is recorded and stored; and finally, the stored temperature value is displayed on the display unit 50.

In this embodiment, an isolation board 13 is further disposed between the infrared emitter 11 and the infrared receiver 12 so that the infrared receiver 12 is ensured to receive the reflected radiant energy.

Figure 5:
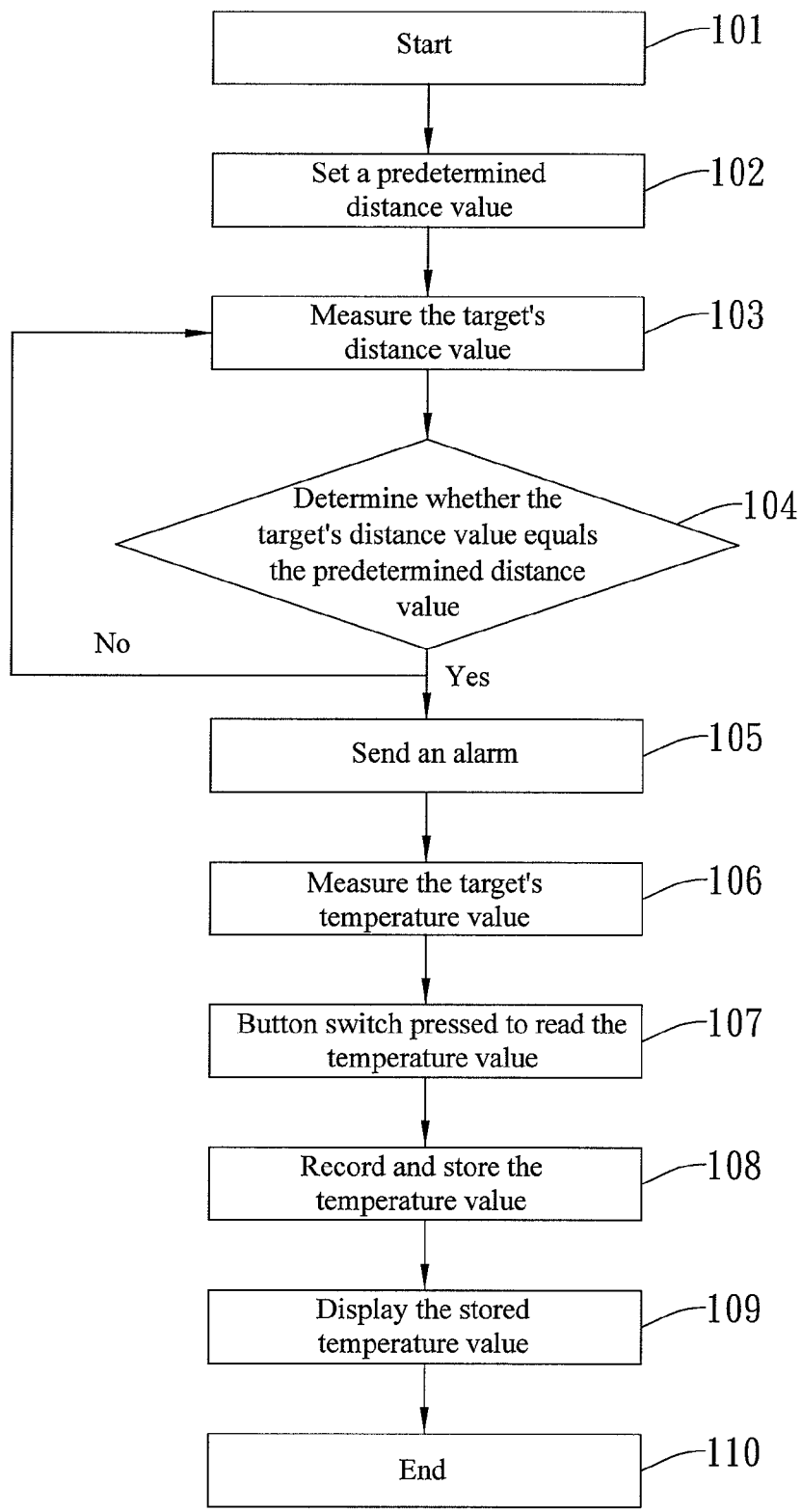
FIG. 5 is a flow chart showing the method for non-contact temperature measurement of the present invention.

Referring to FIG. 5, the flow chart shows an embodiment of the method for non-contact temperature measurement of the present invention. In step 101, the process of measuring the target's temperature starts. In step 102, a predetermined distance value d is set. In step 103, the distance sensor unit 10 is employed to measure the target's distance value, and the measured distance value is sent to the microprocessor unit 40. In step 104, the microprocessor unit 40 receives the distance value measured by the distance sensor unit 10 and determines whether the measured distance value equals the predetermined distance value d; if yes, the operation proceeds to step 105, otherwise the operation goes back to step 103 to repeat measuring the target's distance value. In step 105, the microprocessor unit 40 sends a command to the alarm unit 20, making it send out an alarm. In step 106, upon sending a command to give an alarm, the microprocessor unit 40 also sends a command for the temperature sensor unit 30 to measure the target's temperature value. In step 107, the operator presses the button switch of the push-button to read the temperature value. In step 108, the measured temperature value is recorded and stored. In step 109, the recorded temperature value is displayed, and in step 110, the process for temperature measurement ends.

In step 103 of this embodiment, a distance sensor unit 10 is employed to measure the target's distance. The distance sensor unit 10 is an infrared emitter and receiver device that includes an infrared emitter 11 and an infrared receiver 12 (as shown in FIG. 3). The infrared emitter 11 emits a radiation that hits the target. The infrared receiver 12 receives the radiation reflected from the target and identifies its energy. The radiant energy is then converted to electrical energy in the form of digital signals. A distance $L_1$ closest to the target and a distance $L_2$ farthest from the target can be calculated with the same method. The respective radiant energy at distance $L_1$ and distance $L_2$ is then converted to electrical energy $AD_1$ and $AD_2$ in the form of digital signals. Then, a slope between a point at the distance $L_1$ and a point at the distance $L_2$ can be calculated by applying the above-mentioned values to this slope formula:

$$S = \frac{AD_2 - AD_1}{L_2 - L_1}.$$

The calculation result is then defined in the microprocessor unit 40 to render a value $AD_n$ at every distance $L_n$. The value $AD_n$ is applied to the slope formula, and the distance value $L_n$ between the infrared receiver 12 and the target can be calculated by reversing the formula: $AD_n=((L_n-L_1)\times S)+AD_1$.

Figure 6:
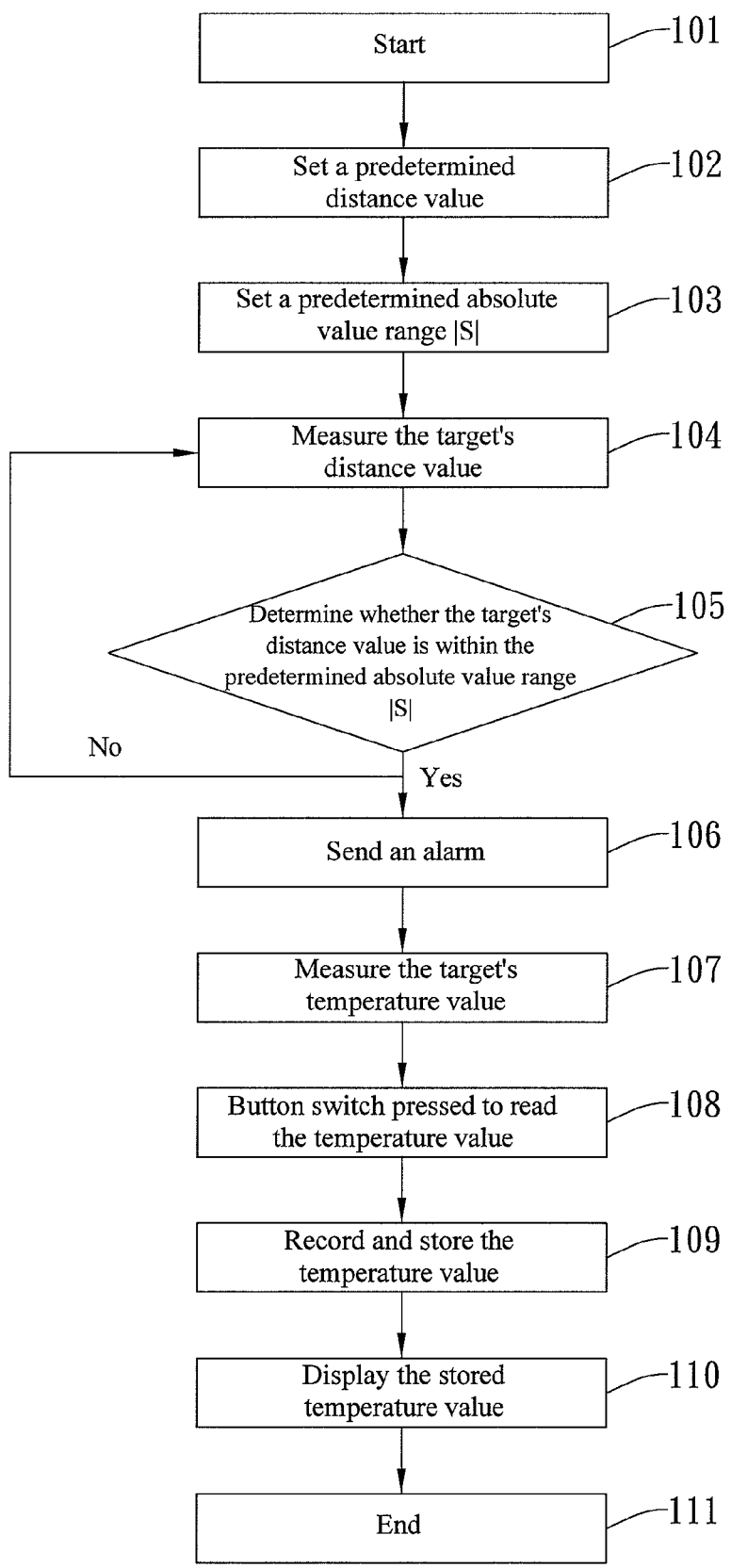
FIG. 6 is a flow chart showing the method of the present invention according to another embodiment.

Referring to FIG. 6, the flow chart shows another embodiment of the method for non-contact temperature measurement of the present invention. In step 101, the process of measuring the target's temperature starts. In step 102, a predetermined distance value d is set. In step 103, a predetermined absolute value range |S| is set. In step 104, the distance sensor unit 10 is employed to measure the target's distance, and the measured distance value is sent to the microprocessor unit 40. In step 105, after receiving the distance value measured by the distance sensor unit 10, the microprocessor unit 40 then begins processing and determines whether the difference between the measured distance value and the predetermined distance value d is within the predetermined absolute value range |S|; if yes, the operation proceeds to step 106, otherwise the operation goes back to step 104 to repeat measuring the target's distance value. In step 106, the microprocessor unit 40 sends a command to the alarm unit 20, making it send out an alarm. In step 107, upon sending a command to give an alarm, the microprocessor unit 40 also sends a command for the temperature sensor unit 30 to measure the target's temperature value. In step 108, the operator presses the button switch of the push-button to read the temperature value. In step 109, the measured temperature value is recorded and stored. In step 110, the recorded temperature value is displayed, and in step 111, the process for temperature measurement ends.

Figure 7:
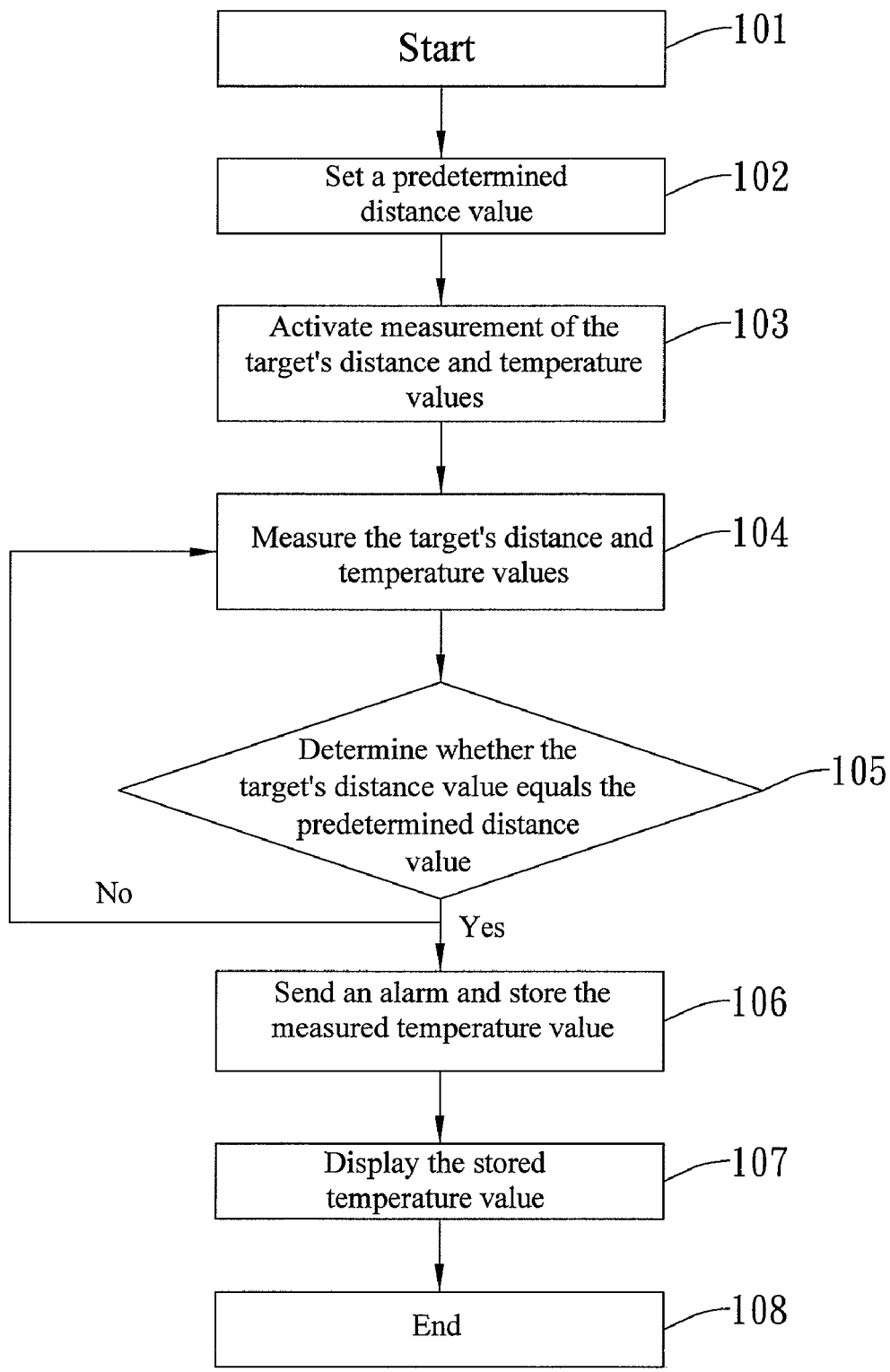
FIG. 7 is a flow chart showing the method of the present invention according to yet another embodiment.

Referring to FIG. 7, the flow chart shows yet another embodiment of the method for non-contact temperature measurement of the present invention. In step 101, the process of measuring the target's temperature starts. In step 102, a predetermined distance value d is set. In step 103, the button switch of the push-button unit is pressed to activate measurement of the target's distance and temperature. In step 104, the distance sensor unit 10 measures the target's distance and the temperature sensor unit 30 measures the target's temperature; the measured distance value and the measured temperature value are then sent to the microprocessor unit 40. In step 105, upon receipt of the distance value measured by the distance sensor unit 10, the microprocessor unit 40 begins processing and determines whether the measured distance value equals the predetermined distance value d; if yes, the operation proceeds to step 106, otherwise the operation goes back to step 104 to repeat measurement of the distance value and temperature value. In step 106, the microprocessor unit 40 sends a command to the alarm unit 20, making it send out an alarm; at the same time, the microprocessor unit 40 sends a command for the temperature sensor unit 30 to record and store the measured temperature value. In step 107, the recorded temperature value is displayed, and in step 108, the process of temperature measurement ends.

The non-contact temperature-measuring device according to the present invention enables operators to measure temperature faster and obtain a more accurate result, wherein uncertainties and errors during the process of temperature measurement are reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A non-contact temperature-measuring device, comprising:
a distance sensor unit for measuring a target's distance;
an alarm unit for giving an alarm when the target's distance falls into a predetermined absolute value range;
a temperature sensor unit for measuring the target's temperature after the alarm unit gives the alarm;
a microprocessor unit for storing the temperature value measured by the temperature sensor unit, for processing a distance signal indicating the target's distance measured by the distance sensor unit and a temperature signal indicating the target's temperature measured by the temperature sensor unit, and for sending a command for the alarm unit to give an alarm when the target's distance value measured by the distance sensor unit falls into the predetermined absolute value range; and
a display unit for displaying the target's temperature value measured by the temperature sensor unit and processed by the microprocessor unit subsequently;
wherein the target's distance is obtained by the difference in radiant energy between the time when the distance sensor unit emits a radiation and the time when the distance sensor unit receives the reflected radiation after hitting the target; and
wherein the distance sensor unit is configured for performing the following steps:
setting a first predetermined distance $L_1$ and a second predetermined distance $L_2$;
receiving and converting the reflected radiation at distance $L_1$ and $L_2$ to electrical energy $AD_1$ and $AD_2$;
obtaining a slope S by applying $L_1$, $L_2$, $AD_1$ and $AD_2$, to the slope formula $$S = \frac{AD_2 - AD_1}{L_2 - L_1};$$

applying a specific distance value $L_n$ between $L_1$ and $L_2$ to the formula $AD_n=((L_n-L_1)\times S)+AD_1$ to obtain electrical energy $AD_n$ at distance $L_n$;
receiving and applying the reflected radiant energy at distance $L_n$ to the formula $$L'_n = \frac{AD_n - AD_1}{S} + L_1; \text{ and}$$

obtaining the target's distance $L_n$ by applying $L_1$, S, $AD_1$ and $AD_n$ to the formula $$L'_n = \frac{AD_n - AD_1}{S} + L_1.$$

2. The non-contact temperature-measuring device of claim 1, further comprising a push-button unit for inputting a command for the temperature sensor unit to start measuring the target's temperature when the distance sensor unit measures the predetermined distance value.

3. The non-contact temperature-measuring device of claim 2 wherein the push-button unit is a button switch.

4. The non-contact temperature-measuring device of claim 1 wherein the distance sensor unit is a radiation emitter and receiver device.

5. The non-contact temperature-measuring device of claim 4 wherein the radiation emitter and receiver device is an infrared emitter and receiver device.

6. The non-contact temperature-measuring device of claim 5 wherein the infrared emitter and receiver device includes an infrared emitter and an infrared receiver.

7. The non-contact temperature-measuring device of claim 6, wherein the infrared emitter is for emitting a radiation, and the infrared receiver is for receiving the radiation reflected from the target after hitting the target wherein the radiant energy is converted into electrical energy in the form of digital signals and the voltage output is for determining the target's distance.

8. The non-contact temperature-measuring device of claim 7 wherein an isolation board is further disposed between the infrared emitter and the infrared receiver so that the infrared receiver is ensured to receive the reflected radiant energy.

9. The non-contact temperature-measuring device of claim 1 wherein the distance sensor unit and/or the temperature sensor unit is/are an infrared sensor and/or an ultrasonic sensor.

10. The non-contact temperature-measuring device of claim 1 wherein the alarm unit is a speaker.

11. The non-contact temperature-measuring device of claim 10 wherein the speaker gives an alarm message of beep.

12. The non-contact temperature-measuring device of claim 1 wherein the alarm unit is an indicator light.

13. The non-contact temperature-measuring device of claim 12 wherein the indicator light is an LED light.

14. The non-contact temperature-measuring device of claim 1 wherein the alarm unit comprises both a speaker and an indicator light.

15. A method for non-contact temperature measurement, including:
setting a predetermined distance value;
measuring a target's distance value;
determining whether the target's distance value equals the predetermined distance value;
giving an alarm;
measuring the target's temperature value and storing the data into memory; and
displaying the stored measurement data;
wherein the target's distance is obtained by the difference in radiant energy between the time when the distance sensor unit emits a radiant energy and the time when the distance sensor unit receives the reflected radiant energy after hitting the target; and
wherein the distance sensor unit is configured for performing the following steps:
setting a first predetermined distance $L_1$ and a second predetermined distance $L_2$;
receiving and converting the reflected radiation at distance $L_1$ and $L_2$ to electrical energy $AD_1$ and $AD_2$;
obtaining a slope S by applying $L_1$, $L_2$, $AD_1$ and $AD_2$ to the slope formula $$S = \frac{AD_2 - AD_1}{L_2 - L_1};$$

applying a specific distance value $L_n$ between $L_1$ and $L_2$ to the formula $AD_n=((L_n-L_1) \times S)+AD_1$ to obtain electrical energy $AD_n$ at distance $L_n$;

receiving and applying the reflected radiant energy at distance $L_n$ to the formula $$L'_n = \frac{AD_n - AD_1}{S} + L_1; \text{ and}$$

obtaining the target's distance $L_n'$ by applying $L_1$, S, $AD_1$ and $AD_n$ to the formula $$L'_n = \frac{AD_n - AD_1}{S} + L_1.$$

16. The method for non-contact temperature measurement of claim 15 wherein a means associated with radiant energy is used in the process of measuring the target's distance.

17. The method for non-contact temperature measurement of claim 16 wherein the radiation is an infrared radiation.

18. The method for non-contact temperature measurement of claim 15, further including a step of pressing a button switch after the step of giving an alarm so that measurement of the target's temperature is activated accordingly.

19. A method for non-contact temperature measurement, including:
   setting a predetermined distance value;
   activating measurement of a target's distance and measurement of a target's temperature;
   measuring a target's distance value and measuring a target's temperature value;
   determining whether the target's distance value equals the predetermined distance value;
   giving an alarm and storing the temperature measurement data simultaneously; and
   displaying the stored measurement data;
   wherein the target's distance is obtained by the difference in radiant energy between the time when the distance sensor unit emits a radiant energy and the time when the distance sensor unit receives the reflected radiant energy after hitting the target; and
   wherein the distance sensor unit is configured for performing the following steps:
      setting a first predetermined distance $L_1$ and a second predetermined distance $L_2$;
      receiving and converting the reflected radiation at distance $L_1$ and $L_2$ to electrical energy $AD_1$ and $AD_2$;
      obtaining a slope S by applying $L_1$, $L_2$, $AD_1$ and $AD_2$ to the slope formula $$S = \frac{AD_2 - AD_1}{L_2 - L_1};$$

applying a specific distance value $L_n$ between $L_1$ and $L_2$ to the formula $AD_n=((L_n-L_1)+AD_1$ to obtain electrical energy $AD_n$ at distance $L_n$;

receiving and applying the reflected radiant energy at distance $L_n$ to the formula $$L'_n = \frac{AD_n - AD_1}{S} + L_1; \text{ and}$$

obtaining the target's distance $L_n'$ by applying $L_1$, S, $AD_1$ and $AD_n$ to the formula $$L'_n = \frac{AD_n - AD_1}{S} + L_1.$$

* * * * *